April 5, 1960  R. PARISI  2,931,193
APPARATUS FOR AUTOMATICALLY MAKING AND DELIVERING ICE CREAM
Filed July 23, 1956  2 Sheets-Sheet 1
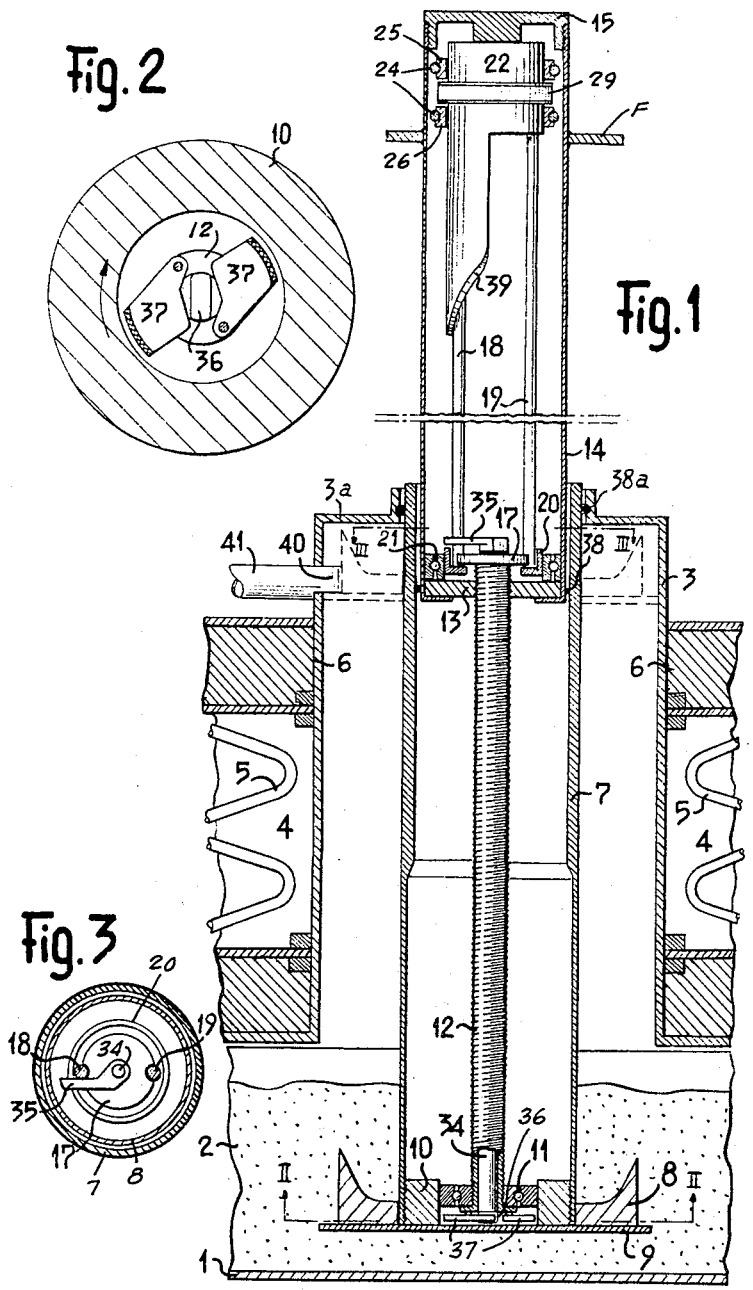
INVENTOR ~
ROGER PARISI April 5, 1960 R. PARISI 2,931,193
APPARATUS FOR AUTOMATICALLY MAKING AND DELIVERING ICE CREAM
Filed July 23, 1956 2 Sheets-Sheet 2
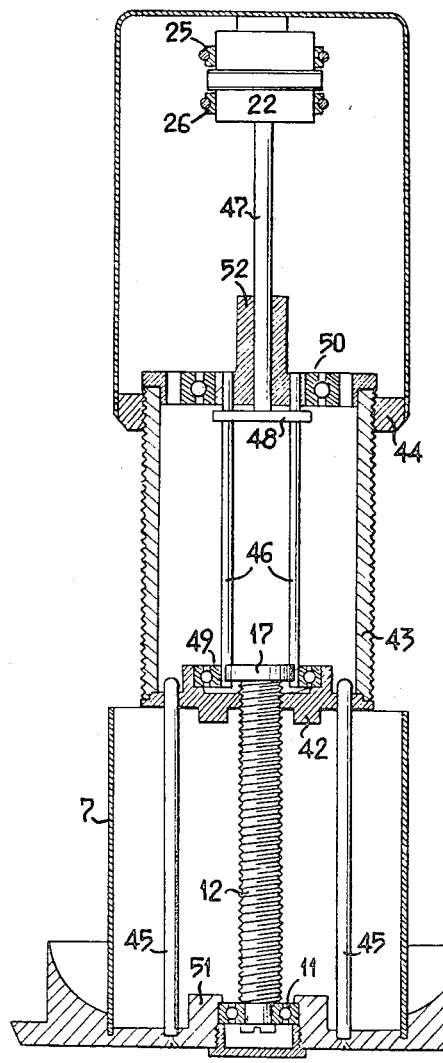
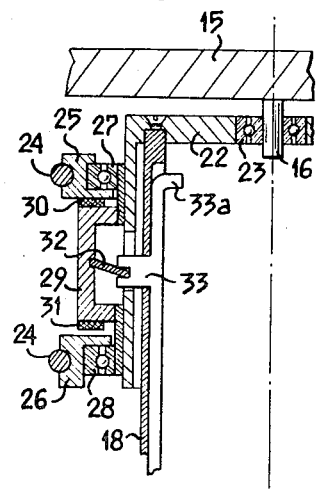
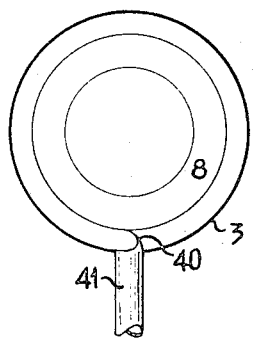
INVENTOR
ROGER PARISI

2,931,193
APPARATUS FOR AUTOMATICALLY MAKING AND DELIVERING ICE CREAM

Roger Parisi, Geneva, Switzerland

Application July 23, 1956, Serial No. 599,581

Claims priority, application Switzerland August 4, 1955

6 Claims. (Cl. 62—342)

It is known that ices are more savoury immediately after their congealing. The latter should take place as rapidly as possible so that the ices obtained are free from spangles, that is to say crystals of relatively large size.

The invention has for its subject an apparatus for quickly delivering portions of ice cream, comprising at least a congealing chamber having a cylindrical refrigerating wall. Said apparatus is characterised in that it comprises at least a cream reservoir located underneath the congealing chamber, a tank of annular shape being plunged into the cream contained in the reservoir, a mechanism being adapted to raise the tank so as to move it axially to the inside of the congealing chamber by causing it to turn about itself in such a manner as to centrifuge the cream against the wall of said chamber.

Two forms of construction of an apparatus according to the invention are shown diagrammatically and by way of example in the accompanying drawing, wherein:

Fig. 1 is a section in elevation of a portion of said apparatus.

Figs. 2 and 3 are sections on the lines II—II and III—III respectively.

Fig. 4 is a fragmentary section on a larger scale of the upper portion of said apparatus shown in Figure 1.

Fig. 5 is a schematic top plan view of the means for removing the ice cream from the congealing chamber.

Fig. 6 is a sectional view of a modified form of construction.

The apparatus shown in Fig. 1 comprises a reservoir 1 for cream 2 located underneath a congealing chamber having a refrigerated cylindrical wall 3. Said wall is surrounded by an annular chamber 4 containing a liquid maintained at a low temperature by refrigeration coils 5. Only a portion of this chamber is shown in the drawing, but it will be understood that said chamber is surrounded by a thermal insulation over the whole of its outer surface, as is usual. A portion of said insulation is visible in Fig. 1 and is indicated by 6. It is further understood that the apparatus is supported in a suitable frame, a portion of which is designated as F and shown in Figure 1.

In the interior of the congealing chamber is located a tube 7 to the lower portion of which is secured a cup 8 of annular shape. Underneath said cup is located a disc 9 of which the diameter corresponds with that of the refrigerating wall 3. The base of the tube 7 is secured to a part 10 in which is secured a bearing 11 enabling a hollow threaded shaft or rod 12 to rotate relatively to the tube 7 while rendering it axially secure therewith. Said rod 12 is screwed at its upper end into a part 13 which is secured to the bottom of a tube 14 fixed relatively to the frame of the apparatus. The outer end of said tube is closed by a cover 15 provided with a pin 16 as shown in Fig. 4. The upper end of the rod 12 extends into the interior of the tube 14 and is provided with a plate 17 having two notches diametrically opposite one another and engaged by two rods 18 and 19 located in the tube 14. Said rods are secured at their lower end on a part 20 which can turn in the tube 14 by reason of a bearing 21. The upper ends of said rods are secured to a part 22 capable of pivoting about the pin 16 of the cover 15 by reason of a bearing 23. Referring particularly to Figure 4, the assembly comprising the rods 18 and 19 and the parts 20 and 22 is capable of turning as a unit about the axis of the tube 14, which enables the threaded rod 12 to be rotatably driven by means of the plate 17. The rotation of said assembly is effected by a motor, not shown, by means of at least a belt 24 rotatably driving two pulleys 25 and 26 in opposite directions. The pulleys can turn freely relatively to the part 22 by reason of bearings 27 and 28. Each of said pulleys may be secured to the part 22 to cause the latter to rotate by means of a sleeve 29 which can slide on said part, but which is secured for rotation with the latter by means, not shown. Said sleeve 29 carries two friction linings 30 and 31 adapted to bear respectively against the flange of the pulleys 25 and 26. Said sleeve 29 is held pressed against one or the other of the pulleys by a conical washer 32 forming a spring. The outer diameter of said washer engages with a groove of the sleeve 29, whilst its inner edge is engaged, at two oppositely diametral points, in sliding bars 33 each located in a longitudinal groove of the rods 18 and 19.

The rod 12 is hollow and contains a bar 34 of which the upper part is secured to a lever arm 35. The lower part of the bar 34 forms a cam 36 adapted to spread two movable jaws 37 whose outer ends are provided with friction linings, so as to cause them to bear against the part 10. Said jaws 37 are hinged to the lower part of the rod 12, so that in their spread position they cause rod 12 to impart rotation to the part 10 and thus also rotate the cup 8. The control of said jaws 37 is obtained by causing the rod 34 to turn by actuating the lever 35.

The operation of the apparatus is as follows:

The reservoir 1 is assumed to contain cream, so that the cup 8 is filled by immersing it therein. When ice cream is desired, the apparatus is set in operation whereby the pulleys 25 and 26 are set in rotation. The rods 18 and 19 are also driven in rotation through the medium of the sleeve 29 which, when setting the apparatus in operation, is in contact with the pulley 25 by means of friction lining 30 carried by said sleeve. The threaded rod 12 is thus rotatably driven through the medium of the rods 18 and 19, which are engaged in notches in plate 17 which is secured to rod 12. Said rod is thus screwed into the part 13 and produces an upward axial movement of the tube 7 and of the cup 8. Said cup is meanwhile not rotatably driven because the friction between the tube 7 and the tube 14, between which is interposed a fluidtight joint 38, is greater than the friction in the ball bearing assembly 11 in which the lower end of rod 12 rotates. A fluidtight joint 38a is also disposed between the outer face of the tube 7 and the cover 3a of the coagulation chamber. When the cup 8 is in the interior of the coagulation chamber, the lever 35, secured to the upper end of the rod 34, comes into contact with a portion of the part 22 forming a cam 39. The movement of translation towards the top, to which the assembly secured to the tube 7 is subjected, produces a rotation of the lever 35 and bar 34 located in the interior of the rod 12, as the end of said lever is moved by the cam 39. The rotation of bar 34 actuates cam 36 (Figure 2) and jaws 37 are thus spread and the friction which results overcomes the friction between tube 7 and tube 14 and causing the cup 8 to turn at the same time as the rod 12. The cream contained in the cup 8 is thus projected by centrifuging against the cooled wall 3 and as the latter is very cold, the congealing of the cream is practically instantaneous. The ice cream formed on said wall is removed by the disc 9 and is lodged between the wall 3 and the cup 8. When the latter reaches its uppermost position, shown in broken lines in Fig. 1, the ice cream surrounding the tank is detached and collected by a scraper or ladle member 40 which projects from the inner surface of the wall 3. Said member 40 is formed at the end of a tube 41 which constitutes a passage for the evacuation of the ice cream. Fig. 5 shows a diagrammatic horizontal section of the cup 8, the wall 3, the member 40 and the end of the tube 41.

The apparatus includes a device for reversing the operation so as to cause the cup 8 to descend into the reservoir 1 for refilling after it has reached the upper position. When the tank and thus the rod 12 reach their upper position, the plate 17 comes into contact with the upper curved end 33a of the rods 33 (Fig. 4), which causes an upward movement of said latter. The conical washer 32 is thus deformed until its inner and outer circumferences are located in the same plane. When the rod has also been subjected to a slight upward movement the washer 32 expands suddenly, in such a manner that its conicity is reversed, that is to say that its outer circumference is lower than its inner circumference. This movement produces a downward movement of the sleeve 29 causing friction lining 31 to engage the flange of the pulley 26, so that the entrainment in rotation of the part 22 is effected through the medium of the pulley 26 which turns in the opposite direction to the pulley 25. The rods 18 and 19 are thus caused to turn in the opposite direction, which produces a downward movement of the rod 12. When the cup 8 is at the bottom of the congealing chamber 3, the lever 35 follows the cam 39, as it is subjected to the return action of a spring, not shown. The jaws 37 also return to the position shown in Fig. 2, by the action of return springs not shown. The cup 8 is therefore not driven in rotation by the rod 12 and, by reason of the friction of the tube 7 against the fluidtight joints 38 and 38a, the rotation of the cup is stopped quickly. In this manner the cup is prevented from plunging into the cream 2 when turning at a high speed which would cause undesirable splashing of cream into the receptacle and into the bottom of the congealing chamber. When the rod 12 reaches its lowermost position, it produces a downward movement of the sliding rods 33 by plate 17 engaging the lower ends of said latter, which are curved in the same manner as their upper ends 33a. The conical washer 32 is deformed until it again assumes the position shown in Fig. 4, thus producing a reversal of the direction of operation. An automatic stopping device, which is not shown in the drawing, is provided for effecting the stopping of the apparatus at this moment. The device may be constituted by a contact controlling the supply to an electric driving motor, said contact being opened by one of the movable parts of the apparatus when the cup is in its lowermost position.

In order that the locking provided between the cup 8 and the rod 12 be less sensitive to the wear of the linings of the jaws 37, it is advantageous for the locking between these two parts to be obtained, before the lever 35 has carried out its maximum angular movement under the action of the cam 39. In order to accomplish this result, the rod 34 should have sufficient elasticity to enable the lever to turn, while its lower part 36 remains immovable.

It will be understood that in the same apparatus may be grouped a number of assemblies, each comprising a cream reservoir, a congealing chamber and the mechanism for driving the tank in such a manner as to make separate ice cream of different flavors.

Fig. 6 shows another form of construction in which the driving mechanism of the tank occupies a lesser height than that shown in Fig. 1. The cup 8 is also secured to the lower part of a tube 7 and its upward movement is controlled by a threaded rod 12 in the manner as in the first form of construction. However, said rod 12 is not screwed into a part which is stationary relatively to the framework, but into a lower part 42 of cylindrical part 43 provided with a threaded outer surface. Said cylindrical part 43 can screw into a threaded bore of a ring 44 which is stationary relatively to the framework of the apparatus.

The part forming the cup 8 is provided with two rods 45 sliding in two holes of the part 42 and opposing any angular movement between said latter part and the cup 8 independent of each other. The upper part of the rod 12 also has a plate 17 for rotatably connecting it with two rods 46, which fit in diametrically opposite notches in plate 17 and which are rotatably driven by two rods 47, of which one is visible in the drawing. The upper ends of the rods 47 are fixed in a part 22 similar to that shown in Fig 4, described with reference to the first form of construction. The lower end of said rods is secured to a ring 48 having two diametrically opposite notches provided on its inner edge and enabling said ring, on the one hand, to slide on the rods 46 and, on the other hand, to drive them rotatably. Said rods 46 can turn relatively to the part 43 and are connected to this by two bearings 49 and 50.

The operation of said apparatus is as follows:

The rod 12 is rotatably driven by means of rods 46, 47 and the pulley 25, in such a manner that the cup 8 is moved axially relatively to the part 43. Said latter remains stationary, by reason of the friction which it produces with the ring 44, said friction being higher than that between the part 42 and the rod 12, by reason of the difference in diameter of the respective screw threads. Said upward movement continues until a portion of the part 42 is abutted by an annular portion 51 of the part forming the cup 8. One of said two parts may, with advantage, be provided with a friction lining. The friction between the two parts renders the cup 8, the part 43 and the rod 12, solid in rotation. The part 43 thus screws into the ring 44, so that the cup 8 moves axially and turns in the interior of the congealing chamber. When the part 43 reaches its uppermost position, a part 52, secured to the end of the rods 46, penetrates into the part 22 so as to produce the reversal of the direction of movement by acting on a device similar to that shown in Fig. 4. As a result a downward movement of the cup 8 occurs and the apparatus has a device for producing the stopping thereof when said tank has reached its lowermost position.

It will be understood that numerous modifications in construction of the apparatus may be provided, for example, the rotatable cup may be replaced by a device for pulverising the cream. Said device may be actuated by compressed air. The scraping disc may then be replaced by a piston sliding in the congealing chamber and the removal of the ice cream may take place at the bottom. In such a form of construction, the wall of the coagulation chamber may also turn around its axis in order to ensure a good uniformity in the thickness of the layer deposited by the pulverising device, said axis, if necessary, being oblique, or even horizontal.

I claim:

1. An apparatus for instantaneously making and automatically discharging increments of ice cream, comprising, in combination, a supporting frame, a first tubular member fixed to said frame, driving means in said first tubular member, a refrigeration unit having an annular congealing chamber disposed coaxially with said first tubular member, said chamber having a discharge outlet in its upper end, a reservoir containing unfrozen cream beneath said chamber, a second tubular member cooperating with said first tubular member for axial and rotatable movement relative thereto, a cup secured to the lower end of said second tubular member and immersible in said reservoir, elevating means cooperating with said driving means for axially moving said second tubular member and said cup without rotation from its immersed position in said reservoir to the congealing chamber, means for rotating said cup when it is within said congealing chamber so as to centrifuge cream contained therein against the wall of said chamber, and scraper means secured to said cup to collect the ice cream formed on the wall of said chamber and deliver it to said discharge outlet.

2. An apparatus according to claim 1 wherein said scraper means is of annular shape and of greater diameter than said cup.

3. An apparatus according to claim 1, wherein a ladle member is secured to and projects laterally from the wall of said congealing chamber adjacent said discharge outlet to detach ice cream formed in said chamber and collected by said scraper means.

4. An apparatus according to claim 1, wherein said driving means includes a rotatable member, a pair of spaced apart pulleys driven in opposite directions and secured to said rotatable member, a sleeve slidably mounted on said rotatable member between said pulleys and means to permit alternate coupling of said sleeve to one or the other of said pulleys.

5. An apparatus according to claim 1, wherein said elevating means includes a threaded hollow shaft located coaxially in said second tubular member, said shaft being axially solid with said second tubular member and capable of turning relative thereto, a fixed plate member located in the lower portion of said first tubular member, said plate member having a threaded opening therein to receive said hollow shaft, and means within said first tubular member connected to said driving means and to said hollow shaft to rotate the latter and thereby cause axial movement of said second tubular member and said cup.

6. An apparatus according to claim 1, wherein said elevating means includes a threaded shaft located coaxially in the interior of said second tubular member, said shaft being axially solid with said second tubular member, and capable of rotating relative thereto, a cylindrical member of lesser diameter than said first and second tubular members and interposed therebetween, said cylindrical member having a threaded outer wall and top and bottom walls, said outer wall threadedly engaging with said first tubular member, the upper end of said shaft being threaded into the bottom wall of said cylindrical member, means for rotatably driving said shaft so as to move said cup axially relative to said cylindrical member, a portion of said cylindrical member being adapted to abut and frictionally engage a portion of said cup, thereby causing said cylindrical member and said cup to rotate and move with each other in the interior of said congealing chamber to centrifuge cream on the walls of said chamber, and means for reversing the direction of rotation of said shaft when said cup has completed its movement in the interior of said chamber.

References Cited in the file of this patent

UNITED STATES PATENTS

| | | |
|---|---|---|
| 239,666 | Palmer | Apr. 5, 1881 |
| 308,593 | Owing | Dec. 2, 1884 |
| 676,662 | Patten | June 18, 1901 |
| 676,666 | Patten | June 18, 1901 |
| 742,482 | Palmer | Oct. 27, 1903 |
| 2,025,757 | Lindsey | Dec. 31, 1935 |
| 2,317,624 | Lindsey | Apr. 27, 1943 |
| 2,648,203 | Heuser | Aug. 11, 1953 |
| 2,650,479 | Kattis | Sept. 1, 1953 |
| 2,778,200 | Gaugler | Jan. 22, 1957 |
| 2,808,706 | Updegraff | Oct. 8, 1957 |